US011713634B1

(12) United States Patent
Hill

(10) Patent No.: US 11,713,634 B1
(45) Date of Patent: Aug. 1, 2023

(54) SYSTEMS AND METHODS TO EFFICIENTLY COOL DRILLING MUD

(71) Applicant: Ensight Synergies LLC, Centerville, TX (US)

(72) Inventor: Brian D Hill, Centerville, TX (US)

(73) Assignee: Ensight Synergies LLC, Centerville, TX (US)

( * ) Notice: Subject to any disclaimer, the term of this patent is extended or adjusted under 35 U.S.C. 154(b) by 0 days.

(21) Appl. No.: 18/061,468

(22) Filed: Dec. 4, 2022

Related U.S. Application Data

(60) Provisional application No. 63/380,572, filed on Oct. 22, 2022, provisional application No. 63/377,046, filed on Sep. 25, 2022, provisional application No. 63/376,097, filed on Sep. 18, 2022.

(51) Int. Cl.
*E21B 21/06* (2006.01)
*G05D 23/19* (2006.01)

(52) U.S. Cl.
CPC ....... *E21B 21/065* (2013.01); *G05D 23/1917* (2013.01)

(58) Field of Classification Search
CPC ... E21B 36/001; E21B 21/065; E21B 23/1917
See application file for complete search history.

(56) References Cited

U.S. PATENT DOCUMENTS

| | | | | |
|---|---|---|---|---|
| 4,215,753 A * | 8/1980 | Champness | ............... | F28D 5/02 175/208 |
| 5,715,895 A * | 2/1998 | Champness | ........... | E21B 36/003 166/57 |
| 6,779,606 B1 * | 8/2004 | Lopez | ....................... | F28D 9/00 166/57 |
| 9,518,434 B1 * | 12/2016 | Champness | ............. | E21B 21/01 |
| 9,617,811 B2 | 4/2017 | Thiessen | | |
| 2007/0246261 A1 * | 10/2007 | Lowe | ...................... | E21B 44/02 175/122 |
| 2012/0048620 A1 * | 3/2012 | Hopwood | ............... | E21B 21/08 175/38 |
| 2016/0010407 A1 * | 1/2016 | McCraw | ............... | E21B 36/001 175/17 |
| 2017/0101827 A1 * | 4/2017 | Orban | ..................... | E21B 44/00 |
| 2018/0094648 A1 * | 4/2018 | Hoffman | .............. | B01D 21/283 |
| 2019/0299128 A1 * | 10/2019 | Arefi | ...................... | B01D 21/34 |
| 2020/0362678 A1 * | 11/2020 | Lesko | ..................... | F04B 9/045 |

\* cited by examiner

*Primary Examiner* — David Carroll
(74) *Attorney, Agent, or Firm* — Todd E. Albanesi; Booth Albanesi Schroeder PLLC

(57) ABSTRACT

Systems and methods are provided for cooling a drilling mud in a drilling operation. In aspects, the disclosure includes drawing the drilling mud from a last active volume mud tank of a plurality of active volume mud tanks and conducting the drilling mud to a heat-exchanger apparatus and then returning the drilling mud to the last active volume mud tank. In other aspects, the disclosure includes a variable frequency drive ("VFD") for controlling a pumping rate of an electrically driven pump for the drilling mud, wherein the VFD is capable of adjusting the pumping rate for pumping of the drilling mud through a heat-exchanger apparatus. In further aspects, systems and methods are provided that use a tube-and-shell heat exchanger. The aspects are independently capable of providing improved efficiency. These and other aspects are preferably used in combination for greater efficiency.

12 Claims, 3 Drawing Sheets

SYSTEMS AND METHODS TO EFFICIENTLY COOL DRILLING MUD

CROSS-REFERENCE TO RELATED APPLICATIONS

This application claims the priority of each of these prior applications:

(a) U.S. provisional application No. 63/376,097 filed Sep. 18, 2022, entitled Enhanced Drilling Mud Cooling System;

(b) U.S. provisional application No. 63/377,046 filed Sep. 25, 2022, entitled Enhanced Drilling Mud Cooling System; and (c) US provisional application No. 63/380,572 filed Oct. 22, 2022, entitled Enhanced Drilling Mud Cooling System; each having for named inventor Brian D. Hill.

Each of the above applications is incorporated herein by reference.

TECHNICAL FIELD

The disclosure provides systems, equipment, and methods for drilling a wellbore into the earth in the fields of oil and gas or geothermal energy production. More particularly, the disclosure regards systems, equipment, and methods for cooling a drilling mud used in a drilling operation.

BACKGROUND

In a drilling operation for oil and gas or geothermal energy production at a well site, a drilling mud is pumped down through a drill string to a drill bit in a wellbore that is being drilled into the earth. The drilling mud is for various purposes such as maintaining downhole pressure balance in a wellbore during the drilling, lubricating the drilling, cooling the drilling, and carrying cuttings from the drilling back up through an annulus around the drill string and out of the wellbore. After returning out of the wellbore, the drilling mud is hotter from having been circulated downhole into the wellbore where temperatures are higher than at the surface.

Because large amounts of a drilling mud are required for the drilling operation, it is desirable and more efficient to recycle the drilling mud for use in the drilling operation. Among other things, to recycle the drilling mud requires that at least some of the cuttings be removed from the drilling mud. The solid cuttings are suspended in the drilling mud and do not immediately settle out of the drilling mud. In addition, to recycle the drilling mud requires that at least some of the heat be removed from the drilling mud. The heat in the drilling mud is not passively dissipated to the ambient atmosphere in the short time before recycling the drilling mud back into the drill string.

After the drilling mud exits the top of the wellbore, the drilling mud is directed to a series of mud tanks. The mud tanks are for various purposes such as providing a reservoir of drilling mud for use in the drilling operation, allowing time for cuttings in the drilling mud to settle out of the drilling mud, facilitating the addition of supplementary materials to the drilling mud to reformulate the drilling mud as may be needed or desired, and allowing time for the drilling mud to cool. However, there are practical limitations on the amount of drilling mud to have at the well site for the drilling operation, such as limitations on the size and volume of the mud tanks, limitations on the economics of obtaining a suitable drilling mud in the necessary amounts, limitations on the economics of disposal of used drilling mud, and limitations on time before desiring to re-use the drilling mud. Accordingly, additional equipment and methods are used to help speed up the removal of the cuttings and to speed up the removal of the heat from the drilling mud after the drilling mud exits from the wellhead of the wellbore.

Conventionally, after the drilling mud exits the wellbore, the drilling mud is routed to a shaker for screening some of the cuttings from the drilling mud.

In addition, after the drilling mud exits the shaker, conventionally the drilling mud is next immediately routed to a series of mud tanks and then from one of the earlier mud tanks in the series of mud tanks to a heat exchanger to help with cooling of the drilling mud. In other conventional systems, the drilling mud is immediately routed to the heat exchanger prior to the shaker for separating cuttings from the drilling mud. Such a prior drilling mud cooling system is described in U.S. Pat. No. 9,617,811, entitled "Drilling Mud Cooling System," issued Apr. 11, 2017, and having for named inventor J. John Thiessen, which is incorporated by reference herein in its entirety.

The costs of heat removal from the drilling mud according to conventional systems and methods are high. In addition, the maintenance costs of equipment in such systems and methods are high. There has been a long-felt need for improved systems and methods that are more efficient.

SUMMARY

In an aspect of the disclosure, a system is provided for cooling a drilling mud, the system comprising:

(a) a heat-exchanger apparatus for removing at least some of the heat from the drilling mud, wherein the heat-exchanger apparatus comprises:

(i) a heat exchanger for removing at least some of the heat from the drilling mud when the drilling mud is pumped through the heat exchanger; and (ii) a mud pump for pumping the drilling mud through the heat exchanger;

(b) a first heat-exchanger conducting line for drawing the drilling mud from a last active volume mud tank of a plurality of active volume mud tanks and conducting the drilling mud to the heat-exchanger apparatus; and (c) a second heat-exchanger conducting line for returning the drilling mud from the heat-exchanger apparatus back into the last active volume mud tank.

In another aspect of the disclosure, a system is provided for cooling a drilling mud, the system comprising:

(a) a heat-exchanger apparatus for removing at least some of the heat from the drilling mud, wherein the heat-exchanger apparatus comprises:

a heat exchanger for removing at least some of the heat from a drilling mud when the drilling mud is pumped through the heat exchanger; and a mud pump for pumping the drilling mud through the heat exchanger, and wherein the heat-exchanger apparatus is operatively connected to any one of a plurality of active volume mud tanks and wherein the heat-exchanger apparatus is operatively connected to return the drilling mud to any one of the plurality of active volume mud tanks; and (b) a variable frequency drive for controlling a pumping rate of an electrically driven pump for the drilling mud, wherein the variable frequency drive is capable of adjusting the pumping rate for pumping of the drilling mud through the heat-exchanger apparatus.

In another aspect of the disclosure, a method is provided for cooling a drilling mud at a well site, the method comprising the steps of:

(a) drawing the drilling mud from a last active volume mud tank of a plurality of active volume mud tanks;
(b) pumping the drilling mud through a heat-exchanger apparatus; and
(c) returning the drilling mud after it has been cooled to the last active volume mud tank.

In yet another aspect of the disclosure, a method is provided for cooling a drilling mud at a well site, the method comprising the steps of:
(a) drawing the drilling mud from any one of a plurality of active volume mud tanks;
(b) pumping the drilling mud through a heat-exchanger apparatus; and
(c) returning the drilling mud after it has been cooled to any one of the plurality of active volume mud tanks; wherein the step of pumping the drilling mud employs an electrically driven mud pump; and wherein the step of pumping additionally comprises: a step of employing a variable frequency drive for controlling a pumping rate of the electrically driven mud pump, wherein the variable frequency drive is capable of adjusting the pumping rate for pumping of the drilling mud through the heat-exchanger apparatus.

Detailed embodiments and examples according to the principles of the principles of the disclosure are provided. However, specific portions or functional details disclosed herein are merely representative for purposes of describing example embodiments. Example embodiments can be embodied in many alternate forms and should not be construed as limited to only the embodiments set forth herein. Example embodiments are capable of various combinations, modifications, equivalents, and alternatives.

BRIEF DESCRIPTION OF THE DRAWING

The accompanying figures of the drawing are incorporated into the specification to help illustrate examples according to various embodiments of the disclosure. Like references are used for like elements or features throughout the figures of the drawing. It should be understood that the figures of the drawing are not necessarily to scale.

These figures together with the description explain the general principles of the disclosure. The figures are only for the purpose of illustrating preferred and alternative examples of how the various aspects of the claimed inventions can be made and used and are not to be construed as limiting the claimed inventions to only the illustrated and described examples. Various advantages and features of the various aspects of the present inventions will be apparent from a consideration of the drawing.

Figure 1:
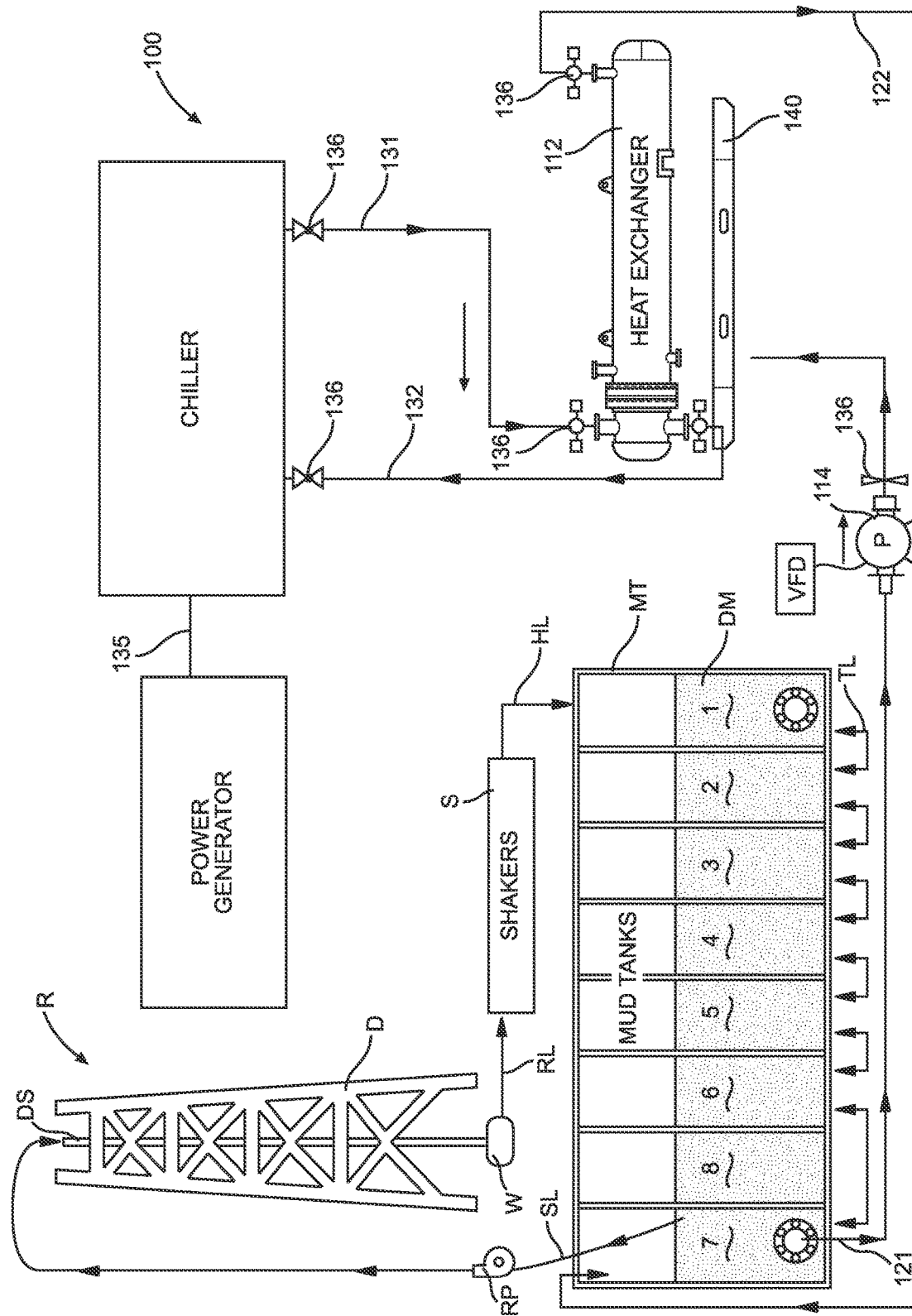

In some alternative embodiments, the functions or acts can occur out of the order noted in the figures. For example, two figures of the drawing shown in succession can in fact be executed substantially concurrently or can sometimes be executed in the reverse or order, depending upon the functionality or acts involved.

FIG. 1 is a diagram of a well site with a drilling rig, shakers, and a plurality of active volume mud tanks having a system according to an aspect of this disclosure for cooling a drilling mud, wherein the system for cooling the drilling mud is operatively connected to the last active volume mud tank of a series of the plurality of active volume mud tanks. In addition, FIG. 1 illustrates a variable frequency drive ("VFD") operatively connected to a mud pump of the heat-exchanger apparatus, wherein the mud pump is an electrically driven mud pump.

Figure 2:
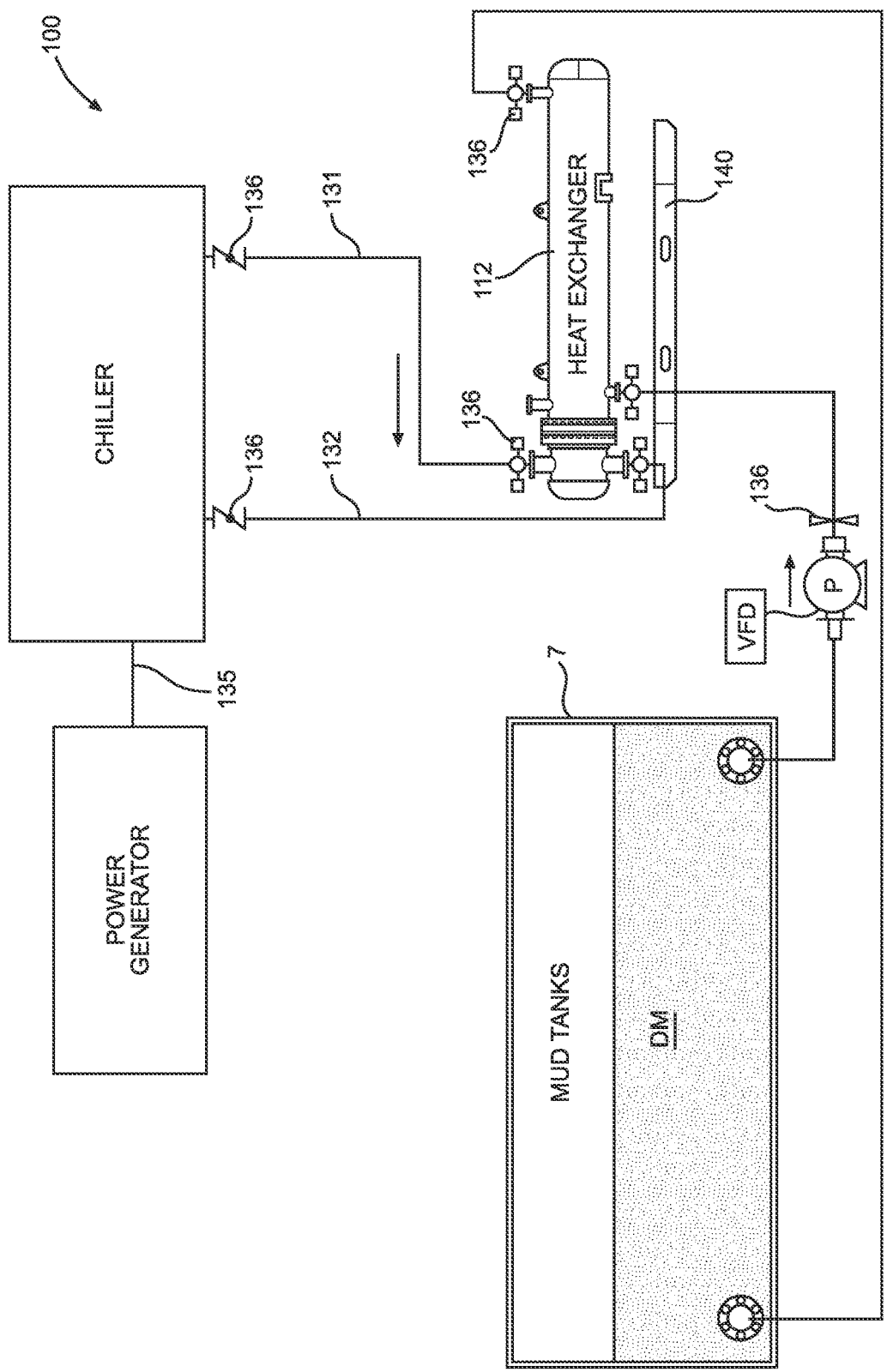

FIG. 2 is a diagram of a system according to an aspect of this disclosure for cooling a drilling mud operatively connected to an active volume mud tank, wherein the heat-exchanger apparatus is shown operatively connected to the last active volume mud tank and wherein the heat-exchanger apparatus has a single chiller and power generator.

Figure 3:
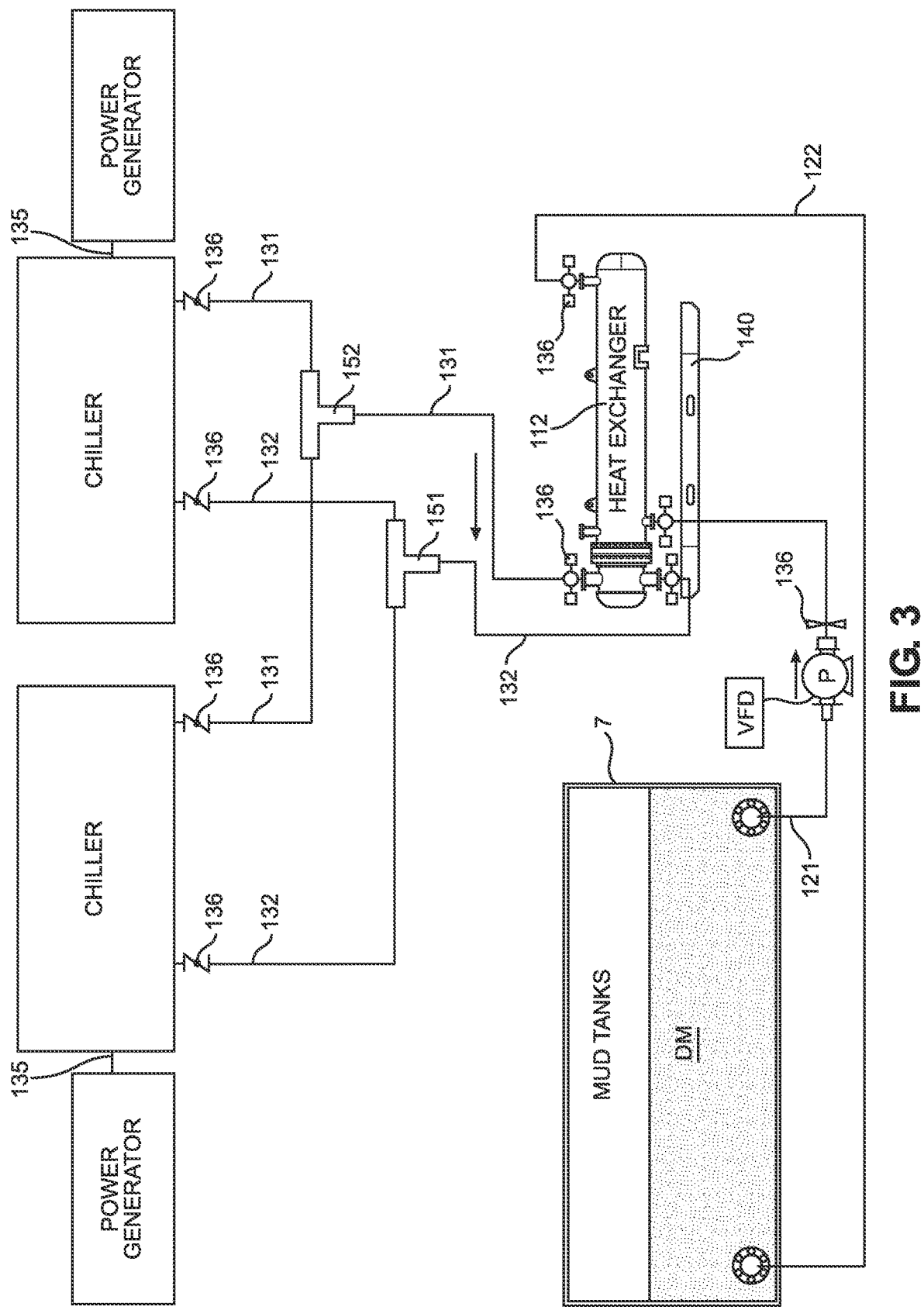

FIG. 3 is a system according to an aspect of this disclosure for cooling a drilling mud operatively connected to an active volume mud tank, wherein the heat-exchanger apparatus is shown operatively connected to the last active volume mud tank and wherein the heat-exchanger apparatus has two chillers and power generators, which can be redundant back up and provide additional chilling capacity for the heat-exchanger apparatus.

DETAILED DESCRIPTION AND EXAMPLES

The disclosure will be described by referring to the general context for the systems and methods and to examples of how they can be made and used.

General Context and Objectives

Typically, heat exchangers used for cooling of the drilling mud in a drilling operation frequently plug up with the cuttings from the drilling mud and don't effectively cool the mud. A drilling mud that is hotter or inadequately cooled causes seal and other rubber damage to the rig equipment and downhole tools. Providing a drilling mud that is cooler and preferably also cleaner of cuttings for downhole use in a drilling operation will reduce non-productive maintenance time. Overall rig operating cost will be decreased by reducing equipment repairs caused by damaged rubber and reducing solids clean out from the heat exchanger.

Aspects Including Drawing from and Returning to the Last Active Volume Mud Tank

As will be described in more detail, in various aspects of the disclosure, improved systems and methods are provided that include taking a drilling mud out of the last active volume mud tank and passing it through a heat exchanger. The cooled and cleaned drilling mud is then returned to the last active volume mud tank.

Drilling mud from the last active volume mud tank is pumped downhole by a rig pump.

The drilling mud in the last active volume mud tank is relatively clean compared to the drilling mud after it exits a wellbore.

In various embodiments, the heat exchanger can be of a tube-and-shell type or a spiral type, although a tube-and-shell type is preferred. The heat exchanger should be of the proper size, that is, having at least a sufficient cooling capacity.

According to these aspects of the disclosure, cooling the drilling mud in the last active volume mud tank will require less energy than cooling the drilling mud in an earlier active volume mud tank in the series of mud tanks because more of the cuttings have previously settled out before the mud is cooled in a heat exchanger.

Aspects Including Using a Variable Frequency Drive [VFD]

As will be described in more detail, in other aspects of the disclosure, improved systems and methods are provided that include a variable frequency drive ("VFD") for controlling a pumping rate of a mud pump that is electrically driven for pumping of the drilling mud to a heat exchanger, wherein the VFD is capable of adjusting the pumping rate for pumping of the drilling mud to the heat exchanger.

A line for drawing mud from a mud tank would be attached to a mud pump of a heat-exchanger apparatus, where the line is separate from a suction line to a rig pump that is for pumping the drilling mud to the drilling rig and into the wellbore. The mud pump of the heat-exchanger apparatus would be electrically driven and regulated by the VFD. The VFD would control the mud pump to pump the drilling mud into and through a heat exchanger at a pumping rate that can be adjusted. That pumping rate is determined by the desired final mud temperature, the desired final viscosity of the drilling mud, and other factors so that an optimum flow of drilling mud through the heat exchanger can be provided. Such a system and method is capable of providing a more efficient BTU removal of heat from the drilling mud. This more efficiently cools the drilling mud.

After being pumped through the heat exchanger, the drilling mud that has been cooled through the heat exchanger is returned to one of the active volume mud tanks, preferably, although not necessarily, to the last active volume mud tank.

The drilling mud in the last active volume mud tank is drawn through a suction line and pumped by the rig pump to the drill string in the wellbore for use in the drilling operation.

Aspects Including a Heat-Exchanger Apparatus Having a Tube-and-Shell Heat Exchanger As will be described in more detail, in further aspects of the disclosure, improved systems and methods are provided that use a tube-and-shell heat exchanger. A tube-and-shell heat exchanger is an efficient type of heat exchanger. The design and operation of a tube-and-shell heat exchanger is known in the field of heat exchangers.

Due to its design structure, a tube-and-shell heat exchanger is less prone to plugging than a spiral heat exchanger or frame/plate heat exchanger conventionally used in a heat-exchanger apparatus for use in cooling a drilling mud at a well site. Less plugging results in less downtime for maintenance. In addition, it is easier to drain and clean a tube-and-shell heat exchanger.

In addition, a tube-and-shell heat exchanger has higher pressure rating than a spiral heat exchanger. Therefore, a tube-and-shell heat exchanger should be able to tolerate higher flow rates (as in using VFD to increase flow rate) compared to a spiral heat exchanger.

Combinations of Aspects or Elements of Preferred Embodiments

The various aspects or embodiments according to the disclosure can be optionally combined.

Drilling Rig

The various aspects and embodiments according to the disclosure will be described in the context of a typical drilling rig.

A drilling rig includes the major equipment used in drilling a wellbore. In onshore operations, the drilling rig includes virtually everything except living quarters. Major components of the rig include the mud tanks, the mud pumps, the derrick or mast, the drawworks, the rotary table or top drive, the drill string, the power generation equipment, and auxiliary equipment, such as shakers, etc., as understood in the art of drilling operations. Offshore, a drilling rig includes the same components as onshore, but not those of the vessel or drilling platform itself. The drilling rig is commonly simply referred to as the "rig."

FIG. 1 is a diagram of some of the basic components of a rig, generally referred to by the reference R, including a rig pump RP, a derrick D, a drill string DS, and one or more shakers S, and a plurality of mud tanks MT. The rig R is connected to a wellhead W of a wellbore (not shown) being drilled into the earth (not shown).

As is well known in the field, a drilling mud is used in a drilling operation for drilling a borehole of a wellbore into the earth. A drilling mud DM pulled from the mud tanks MT through a suction line SL by the rig pump RP and pumped to the drill string DS and down into the wellbore. The drilling mud is circulated down through drill string DS to the bottom of the wellbore during drilling and then the drilling mud is returned through an annulus outside the drill string upward to the wellhead W. After exiting the wellhead W, a return line RL conducts the used drilling mud to the shakers S. After passing through the shakers S to remove at least some of the cuttings from the used drilling mud, the drilling mud, which is still hot, is conducted through a hot mud line HL and returned to the mud tanks MT. A rig pump RP is typically a piston pump or a plunger pump because positive displacement pumps can achieve higher pumping pressures than a centrifugal pump.

The drilling mud serves several purposes, such as lubricating and cooling the drilling process in the borehole of the wellbore and carrying cuttings from the drilling process up and out of the wellbore. As downhole conditions are usually hotter than the ambient outdoor weather temperatures at the well site for the drilling rig, the drilling mud is heated in the wellbore and comes out of the well at a hotter temperature than desired for recycling back downhole.

The rig R includes a return line RL for conducting the drilling mud with cuttings from the wellhead W of the wellbore, wherein the return line RL is operatively connected from a bell nipple of a blowout preventer of a wellhead W of the wellbore to the cuttings-separating apparatus, such as a shaker S. After at least some of the cuttings are removed from the drilling mud by the shaker S, the drilling mud is conducted from the shaker S through the hot mud line HL to the mud tanks MT.

The shakers S are a type of a cuttings-separating apparatus for separating at least some of the cuttings from a drilling mud with cuttings to obtain a drilling mud with reduced cuttings, wherein the cuttings-separating apparatus is operatively connected between the wellbore and one or more of the mud tanks MT. As is known in the field, a shaker comprises a shaker screen for separating cuttings from the drilling mud and a motor for shaking the shaker screen (not shown). Cuttings that cannot pass through the shaker screen are disposed of, where the drilling mud otherwise passes through shaker screen of the shakers S.

The mud tanks MT typically include at least a plurality of mud tanks that are connected in series such that the drilling mud moves sequentially from one mud tank to the next. The number of mud tanks MT can vary, where in the illustrated embodiment there are eight of such mud tanks numbered 1-8.

Mud tanks MT are typically provided as large tank modules on big skids (not shown). The large tank is typically constructed to be about 8' tall×about 10' wide×about 30' long, with two or three dividers to provide individual mud tanks, such as mud tanks number 1-2. Another tank module is similarly provided for use as mud tanks numbered 3-4, etc. There are typically ports or openings between the divided mud tanks in a larger tank module. In addition, there are lines connecting tanks between such larger tank modules.

The mud tanks MT can serve different purposes. One or more of the mud tanks MT can be used as settling pits, one or more of the mud tanks MT can be used as active volume mud tanks, and one or more of the mud tanks MT can be used as a slugging tank.

A settling tank is a mud tank that is used for allowing at least a little time for cuttings to settle from the drilling mud. In the embodiment illustrated in FIG. 1, three of the mud tanks MT numbered 1-3 are used as settling pits and sometimes referred to as settling pits or settling tanks 1-3.

An active volume mud tank is a mud tank that has a volume of drilling mud actively moving through the mud tank for use downhole in the wellbore of a drilling operation. The last active volume mud tank is the last in a series of a plurality of active volume mud tanks. The drilling mud is drawn from the last active volume mud tank and pumped by the rip pump RP to the drill string DS and down into the wellbore. In the embodiment illustrated in FIG. 1, four of the mud tanks MT numbered 4-7 are used as active volume mud tanks and sometimes referred to as active volume mud tanks 4-7. The active volume mud tank numbered 7 is used as the last active volume mud tank 7 in the illustrated embodiment.

In the embodiment illustrated in FIG. 1, the mud tanks MT include a mud tank that is used as a slugging tank and sometimes referred to as slugging tank 8. The fluid in the slugging tank 8 is normally held in reserve. In a slugging tank, "slugs" are mixed that are used to pump downhole for various purposes, including for stopping lost circulation, which occurs when a drilling mud is being lost into the porous rock formation or cracks in the bore hole. Creating these slugs or volumes of highly viscous mud, a highly weighted (dense) mud, or a lost circulation fluid can be performed in the slugging tank. When called for, such a slug can be pumped from the slugging tank into the line that goes to the standpipe, through the top drive and into the drill string DS. For example, a slugging tank is a mud tank that can be used for mixing and temporarily storing a slug of very high viscosity fluid or very high weight (density) in case needed or desired to stop gas from escaping the wellbore. For another example, a slugging tank can be used for making and temporarily storing a lost circulation fluid containing a lost circulation material, such a material of ground walnut shells, in case needed or desired to stop losing a drilling mud into a downhole rock formation.

The mud tanks MT that are numbered 1-7 are connected in series from mud tank 1 successively to mud tank 7. Mud tank 8 is separate because it is used as a slugging tank in case needed and can be connected to the suction line SL in such a case.

The mud tanks MT have one or more tank connecting lines TL for conducting the drilling mud between the plurality of mud tanks MT numbered 1-7 that are used as settling tanks 1-3 and active volume mud tanks 4-7. The tank connecting lines TL are operatively connected between the plurality of mud tanks, whereby the plurality of mud tanks are operatively connected in series from one or more earlier mud tanks to one or more later mud tanks, and wherein one of the one or more later mud tanks is a last active volume mud tank.

The returns of the drilling mud from the wellbore flow into the settling pits 1-3 as is normal and through the active volume mud tanks 4-7 as is normal. The mud flow returns exiting the drill string and shakers enters mud tank 1. Mud tanks 1-7 are connected in to allow free flow of the drilling mud between tanks. There is free flow for the drilling mud to pass in series into Tank 2, 3, 4, 5, 6, and finally 7. The mud settles out some of the solids in all the mud tanks 1-7. Essentially, the rig pump RP pulls from the last active volume mud tank 7 to return this same flow rate downhole to complete the cycle of drilling mud. As the rig pump RP pulls from mud tank 7, it lowers the mud height in the tank and allows gravity flow of the drilling mud to mud tank 7 from earlier mud tanks 6, 5, 4, 3, 2, and 1.

The rig R additionally includes a suction line SL for drawing the drilling mud from the last active volume mud tank 7 and delivering the drilling mud to the drill string DS. The suction line SL is operatively connected to the rig pump RP for pumping the drilling mud into the drill string DS in a wellbore of a well. Typically, the suction line SL is operative connected to a suction manifold (not shown) connected to the last active volume mud tank 7.

Improved System and Methods for Cooling a Drilling Mud

Conventionally, the drilling mud from a first or earlier mud tank in the series of mud tanks is cooled. However, this has major disadvantages.

According to this disclosure, improved systems and methods for cooling a drilling mud are provided.

Continuing to refer to the diagram of FIG. 1, the rig R is provided a system 100 for cooling a drilling mud according to an embodiment of this disclosure. The system 100 includes a heat-exchanger apparatus 110, wherein the heat-exchanger apparatus 110 includes at least: (i) a heat exchanger 112 for removing at least some of the heat from the drilling mud when the drilling mud is pumped through the heat exchanger 112; and (ii) a mud pump 114 for pumping the drilling mud through the heat exchanger.

In addition, lines are provided for conducting the drilling mud to and through the heat exchanger 112 of the heat-exchanger apparatus 110, as hereinafter described in more detail.

In various embodiments, the heat-exchanger apparatus 110 additionally includes: a chiller for cooling a coolant fluid; and a coolant pump (not shown) for circulating the coolant fluid between the chiller and the heat exchanger 112 of the heat-exchanger apparatus. The coolant pump can be part of the chiller. The coolant pump pumps the coolant fluid though a coolant fluid outlet line 131 from the chiller, through the heat exchanger 112, and back to the chiller through coolant fluid inlet line 132.

In various embodiments, the chiller comprises: a refrigerant fluid, a refrigerant fluid circulating line, a refrigerant fluid pump, an expansion valve for the refrigerant fluid, and a refrigerant heat exchanger, wherein the chiller is operatively connected to the refrigerant heat exchanger for cooling the coolant fluid with the refrigerant fluid that has expanded through the expansion valve. Chillers are well known in the art.

In various embodiments, the coolant fluid comprises a fluid selected from the group consisting of water, an alcohol, a glycol, and any combination thereof. In various embodiments, the coolant fluid is or comprises water. In various embodiments where the coolant fluid is or comprises water, the coolant fluid is substantially free of a coolant fluid other than water. This can be advantageous to avoid environmental concerns regarding the use of a coolant fluid that includes substantial amounts of an organic chemical.

In various embodiments, the heat exchanger of the heat-exchanger apparatus is or additionally includes an ambient-air heat exchanger. However, an ambient-air heat exchanger would typically not be used as a primary heat exchanger for cooling the drilling mud. In various embodiments, an ambient-air heat exchanger is used as a secondary, additional heat exchanger in the heat-exchanger apparatus.

In various embodiments, the system 100 additionally includes a power generator for generating electrical power for the chiller for the heat-exchanger apparatus. The power generator is operatively connected to the chiller by an electrical line 135. In various embodiments, the power generator is driven by a fuel selected from the group consisting of diesel, gasoline, liquified petroleum gas, propane, natural gas, and any combination thereof.

In various embodiments, the mud pump 114 is sized such that it is capable of matching the flow of drilling mud pulled from the last active volume mud tank 7 by the rig pump RP. Higher flow rate through the heat exchanger 112 can further reduce the temperature of the drilling mud in mud tank 7.

In various embodiments, the mud pump 114 is selected from the group consisting of a centrifugal pump, a piston pump, or a plunger pump. In various embodiments, the mud pump 114 is electrically driven.

In various embodiments, various valves 136 are provided in the system 100 for selectively controlling the flow of the drilling mud from the mud tanks MT and the coolant fluid from the chiller through the heat exchanger 112.

In various embodiments, the equipment of the heat-exchanger apparatus can be mounted on one or more skids. A mounting on a skid allows the equipment to be handled by a forklift for positioning the equipment as may be desired on a well site. For example, as illustrated in FIG. 1, the heat exchanger 112 can be mounted on a skid 140.

Drawing the Drilling Mud from the Last Active Volume Mud Tank for Cooling

According to an aspect of the disclosure, rather than cooling the drilling mud from a first or earlier mud tank, as was conventionally done, the drilling mud is allowed to have solids, especially the cuttings, settle out and remain in the settling tanks 1-3 and allow for further settling in the active volume mud tanks 4-6 of the mud tanks MT. Solids in the mud typically hold heat, so, reducing the solids carried in the drilling mud before cooling the drilling mud will allow more efficient cooling with lower energy required. This allows for the use of equipment that has a smaller heat exchange capacity, and, accordingly, the use of a dimensionally smaller heat-exchanger apparatus 110. A smaller system 100 for cooling the drilling mud allows for a smaller footprint for the equipment at the well site.

The drilling mud DM in the last active volume mud tank 7 after it is processed through the earlier mud tanks 1-6 in the series of the mud tanks 1-7 would typically still be hotter than desired for pumping by the rig pump RP to the drill string DS and downhole into the wellbore for use in the drilling operation. For example, the drilling mud in mud tank 6 could still be at a hotter temperature than desired, such as around 120° F.

According to an aspect of the disclosure, the drilling mud is drawn from the last active volume mud tank 7, that is, the furthest of the mud tanks MT after solids control process through the shakers S and the earlier mud tanks 1-6, to the heat-exchanger apparatus 110.

The drilling mud from the heat-exchanger apparatus 110, after it has been cooled, for example, down to 60° F., is then directed back to the last active volume mud tank 7. For example, the drilling mud from the heat-exchanger apparatus can be directed into the top or an upper portion of the last active volume mud tank 7, for example through a line described as a candy cane or goose neck. Accordingly, only the last active volume mud tank 7 is needed to be cooled rather than more or all of the mud tanks 1-7, saving energy.

In various embodiments, the system 100 has a first heat-exchanger conducting line 121 is operatively connected to draw the drilling mud from the last active volume mud tank 7 and conduct the drilling mud to the heat exchanger 112. In various embodiments, the first heat-exchanger conducting line 121 is operatively connected to draw the drilling mud from a lower portion of the last active volume mud tank 7.

In various embodiments, the system 100 has a second heat-exchanger conducting line 122 is operatively connected to return the drilling mud from the heat exchanger 112 to the last active volume mud tank 7. In various embodiments, the second heat-exchanger conducting line 122 is operatively connected to return the drilling mud to an upper portion of the last active volume mud tank 7.

In the last active volume mud tank 7, there could be various temperature gradients. For example, hotter incoming drilling mud may be coming in to a lower portion of mud tank 7 from earlier mud tank 6, drilling mud may be drawn out of a portion of the last active volume mud tank 7 to the heat-exchanger apparatus 110, and cooled drilling mud may be coming into an upper portion of the mud tank 7, and a suction line SL out to the rig pump RP may be drawing the drilling mud from a middle portion the mud tank 7. The last active volume tank is essentially a mixing pot of the drilling mud as it comes into the mud tank 7 from an earlier mud tank 6, and as some of the drilling mud in the mud tank 7 is circulated through the heat-exchanger apparatus 110, and then as some of the drilling mud is pumped from the mud tank 7 to the drill string DS.

In various embodiments, the drilling mud is drawn from at or near the bottom of the last active volume mud tank 7 to the heat-exchanger apparatus 110. In various embodiments, the drilling mud is returned from the heat-exchanger apparatus 110 to at or near the top of the last active volume mud tank 7. The drilling mud can be drawn from the bottom of the last active volume mud tank 7, pumped through a heat exchanger 112, and returned to the top or upper portion of the same mud tank 7. This optionally provides a temperature gradient from a lower portion to an upper portion of the last active volume mud tank 7, where the coolest temperature of the drilling mud is in the upper portion of the last active volume mud tank 7.

In various embodiments, the drilling mud is drawn by the rig pump RP from the upper portion of the last active volume mud tank 7. In a situation where the suction line SL to the rig pump RP draws from the top or upper portion of the last active volume mud tank 7 and where the second heat-exchanger conducting line 122 from the heat-exchanger apparatus 110 is to or near the top of the same mud tank 7, this places the cooled drilling mud closest to the suction manifold inlet for the rig pump RP. In such an embodiment, a temperature transient or gradient between the hot mud at the bottom of the last active volume mud tank 7 and the coolest mud at the top of the tank where the chilled mud is returned, allows this coolest portion of the drilling mud in the last active volume mud tank 7 to be pumped downhole.

However, in many situations, an existing suction manifold determines where in the last active volume mud tank 7 the drilling mud is drawn from by the rig pump RP. The location of the suction manifold can be different in different mud tanks, but the suction manifold on a mud tank is not designed to be moveable.

For example, thermally, drilling mud is removed from the bottom or a lower portion of the last active volume mud tank 7. This hot drilling mud is pumped through the heat exchanger 112 and returned as cooler drilling mud to the top of mud tank 7. In various embodiments, this may be essentially the same quantity of drilling mud that comes from the drill rig returns and is essentially matched by the rig pump RP pulling the cooled mud from last active volume mud tank 7 to a standpipe (not shown) and top drive to the drill string DS. In other embodiments, the flow rate of drilling mud that is circulated through the heat exchanger is different than the flow rate of the drilling mud pumped by the rig pump RP to the drill string DS, provided that the flow rate and degree of cooling through the heat-exchanger apparatus 110 is sufficient to cool the drilling mud in the last active volume mud tank 7 to a desired temperature for use in the wellbore.

The temperature of the drilling mud in the last active volume mud tank 7 is preferably reduced substantially from a higher temperature at which the drilling mud is returned from the wellbore and from the higher temperatures in the earlier mud tanks 1-6. However, the temperature of the drilling mud in the last active volume mud tank 7 is preferably not reduced below about 60° F. to avoid unduly changing the viscosity and other physical properties of the drilling mud.

According to this aspect of the disclosure, using the heat-exchanger apparatus to cool the drilling mud in the last active volume mud tank 7 is more efficient than cooling the drilling mud in more than one of the mud tanks MT. This aspect of the system and method allows the use of less power and smaller equipment for the heat-exchanger apparatus to achieve the desired cooling for the drilling mud.

VFD for Controlling Pumping Rate Through Heat-Exchanger Apparatus

According to another aspect of the disclosure, a VFD (variable frequency drive) is provided to adjust pumping rate for the mud pump 114 of the heat-exchanger apparatus, wherein according to such an aspect the mud pump 114 is electrically driven. For example, adjusting AC electrical frequency from standard of about 60 Hz to another frequency would alter the rpm and gpm of the mud pump 114.

In various embodiments, the flow rate of drilling mud going through the heat-exchanger apparatus 110 is capable of being matched to the flow rate of the drilling mud coming from and returning to the drill string DS. In addition, in various embodiments the VFD can control the pumping rate of the mud pump 114 to pump a lower or higher flow rate of drilling mud through the heat-exchanger apparatus than the flow rate of drilling mud moving through mud tanks MT and pumped to the well by the rig pump RP. There is often a benefit to have the VFD controlled flow rate through the heat-exchanger apparatus 110 be higher than the flow rate of drilling mud being pumped to the drill string DS to move more drilling mud through the heat exchanger 112 than is being pumped through the rig pump RP. For example, in various embodiments the VFD can be set to cause the mud pump 114 to operate at 20% higher flow rate than the rig pump RP in order to have more of the drilling mud circulated and cooled through the heat-exchanger apparatus 110 than the rate the drilling mud is being pumped by the rig pump RP. Such VFD control of the mud pump 114 can control the rate of pumping the drilling mud through the heat exchanger 112, which can help control the temperature of the drilling mud before it pumped by the rig pump RP to the drill string DS.

The VFD is capable of adjusting the pumping rate of pumping of the drilling mud through the heat-exchanger apparatus 110. Accordingly, the VFD is capable of optimizing the BTU exchange through the heat-exchanger apparatus by adjusting the flow rate through the exchanger to maximize the efficiency of the exchange.

In an aspect of a method according to the disclosure, the step of employing the variable frequency drive for controlling a pumping rate is determined by a degree of desired cooling of the drilling mud in the last active volume mud tank, whereby an undesired inadequate degree of cooling or an undesired excessive degree cooling of the drilling mud is avoided and an improved cooling efficiency can be achieved using the heat-exchanger apparatus for cooling the drilling mud relative to not using the variable frequency drive.

Types of Heat Exchangers

In various embodiments, the heat-exchanger apparatus 110 has a heat exchanger 112 that is a tube-and-shell heat exchanger. A tube-and-shell heat exchanger is essentially a collection of tubes enclosed within a pressurized outer shell. This device works by channeling one fluid through the smaller tubes and the other through the outer shell to achieve heat exchange. A pump pushes hot drilling mud from the last active volume mud tank 7, preferably to the shell side of the tube-and-shell heat exchanger. The coolant fluid (preferably water, but it can be glycol or other suitable fluid), is cooled in the chiller. The chiller is powered by electricity from the generator and acts like a refrigerator or air-conditioning unit. The cold coolant fluid is pumped into the tube side of the tube-and-shell heat exchanger and moves in the opposite direction from the drilling mud in the shell side of the tube-and-shell heat exchanger. The drilling mud flow enters and goes longitudinally through to other end while the coolant fluid goes through in the opposite direction. Heat is exchanged from the drilling mud to the coolant fluid This provides the cooling effect on the drilling mud. This coolant fluid then moves back to the chiller to be cooled again. A higher flow rate through the heat-exchanger apparatus 110 can be particularly beneficial with a tube-and-shell heat exchanger, for which the internal geometry allows more throughput.

In various embodiments, the heat-exchanger apparatus 110 has a heat exchanger 112 that is a spiral heat exchanger. A spiral heat exchanger does not use tubes. Hot mud would flow into a port and be directed between spiral plates then out another port. The coolant fluid would flow in a different port and flow spirally and adjacent between the hot chambers and out a different port, never contacting the mud. However, a higher flow rate than design limits is less preferred in a spiral heat exchanger due to the closed flow path and spiral internal geometry.

In various embodiments, the heat exchanger 112 is cooled with a coolant fluid that is chilled with a chiller powered by a generator.

The drilling mud is preferably chilled to the maximum amount allowed by the chiller BTU exchange rate or chiller tonnage capacity.

It should be understood that more than one heat exchanger 112 can be used in a system according to the various aspects of the disclosure. A system can use two or more of the same or different kinds of heat exchangers. For example, a system according to the disclosure can additionally use a "fin fan" heat exchanger to utilize ambient outside air at the well site to further reduce the temperature in the heat exchanger 112, which reduces the energy consumption cost in reaching the desired mud cooling with lower power current load.

Systems and Methods Having Single or Dual Heat-Exchangers for Desired Capacity

FIG. 2 is a diagram illustrating a system 100 having a single chiller and power generator similar to FIG. 1. FIG. 3 is a diagram illustrating a system 100 having an additional chiller and power generator, that is, having two chillers and two power generators. In various embodiments according to the diagram of FIG. 3, the two chillers are operatively connected to the heat exchanger 112 via coolant fluid outlet line 131 from each of the chillers and combined at a first fluid junction 151 and similarly operatively connected via the coolant fluid inlet line 132 at a second fluid junction 152.

In various embodiments, a system 100 having two chillers and power generators according to an embodiment such as illustrated in FIG. 3 can provide additional or redundant cooling capacity to the heat exchanger 112.

A system 100 including one or more heat exchangers 112 and one or more chillers are preferably sized to the proper BTU removal or tonnage requirement for a system according to the disclosure. For example, it can be desirable for a system 100 to have a cooling capacity anywhere in a range of 40 tons to 1000 tons, depending on chiller capacity available, such as 300 T.

Improvement Benefits and Advantages

The disadvantages of prior art systems and methods are largely mitigated by improved systems and methods according to this disclosure.

Conventional systems and methods draw drilling mud to a heat exchanger from the first or second settling mud tank in a series of mud tanks and route the drilling mud to a heat exchanger, then pump the drilling mud from the heat exchanger to another mud tank in the series of active volume mud tanks. This provides less time for settling of the cuttings in the mud tanks before pumping the drilling mud to the heat exchanger. Because the cuttings carry heat energy, carrying more of the cuttings through the heat exchanger with the drilling mud results in poor cooling efficiency for the drilling mud. In addition, the cuttings cause plugging and damage to the heat exchanger and associated mud pump and lines.

According to an aspect of the improvement of this disclosure, allowing the drilling mud to spend more time in a series of active volume mud tanks allows for more settling and removing of the cuttings from the drilling mud before pumping the drilling mud through a heat exchanger. Because the cuttings carry heat energy, allowing more settling time for removing more of these undesired solids from the drilling mud before pumping the drilling mud through the heat exchanger reduces the drilling mud temperature more efficiently with the same expenditure of energy by the heat-exchanger apparatus.

Systems and methods according to this aspect of the disclosure are more efficient in comparison to conventional systems and methods that cool the full quantity of mud in the mud tanks as it circulates through. By allowing cuttings to settle in the active volume mud tanks prior to cooling the drilling mud, the cooling capacity of the heat exchanger is more directed to the drilling mud having less cuttings, the temperature of the drilling mud is lowered more efficiently, and the required energy for cooling the drilling mud is reduced. There is no need to cool the cuttings that settle in the series of active volume mud tanks prior to the last active volume mud tank. The improved efficiency of the cooling systems and methods, as described, significantly reduces the net cost per BTU heat removed from the drilling mud.

This provides a capability of providing cooler drilling mud than prior systems and methods or at least provides a capability of providing the cooled drilling mud more efficiently than in prior systems and methods. A cooler drilling mud will reduce rubber damage to various components in the equipment that the drilling mud contacts, including rig pump seats, seals, liners, and swabs. Many downhole tools also include rubber components, such as motor stators and downhole tool seals and O-rings. Reducing rubber damage to all components will reduce repair costs and non-productive maintenance time and increase the service interval.

In addition, the greater removal of cuttings results in less plugging and less maintenance of the heat exchanger and associated equipment. Pulling drilling mud from the last active volume mud tank provides cleaner drilling mud having less cuttings to the heat exchanger apparatus, resulting in lower heat exchanger cleanout costs and down time for maintenance.

Furthermore, allowing time for the drilling mud to settle in all the active volume mud tanks according to this disclosure will also tend to allow the temperature of the drilling mud to somewhat reduce before further cooling the drilling mud in a heat exchanger. This will reduce some of the heat energy that needs to be removed by the heat exchanger and reduce energy usage for the heat exchanger. Furthermore, reduced drilling mud temperature before pumping the drilling mud through the heat exchanger results in less rubber damage due to temperature throughout the heat exchanger apparatus.

Conventional drilling mud cooling systems and methods use a mud pump that just runs at full speed; the conventional systems and methods do not use a VFD. According to another aspect of this disclosure, using a VFD for an electrically driven mud pump will allow controlling the operating speed of the mud pump and the flow rate of drilling mud through the heat exchanger apparatus. This has the capacity to "right-size" the operation of the system 100 to the cooling requirements and provides a more efficient operation.

The drilling mud having reduced cuttings can be cooled in essentially one step through the heat-exchanger apparatus.

In various embodiments, for greater cooling capacity the system can have more than one chiller that can be run in dual or tandem modes, whereas this opportunity does not typically exist with conventional drilling mud cooling systems and methods.

Conventional drilling mud cooling systems have a larger footprint on the well site than the improved systems according to this disclosure, resulting in higher rig costs. Lower system energy requirement results in smaller equipment requirements and smaller well site footprint. By better organizing and sizing the equipment for better efficiency, the overall equipment footprint is reduced, typically, by over 30%. A reduced footprint required for the equipment is achieved by eliminating the use of unnecessarily oversized equipment such as water coolers, haul trailers, chillers, and power generators while also simplifying the system and method.

Conventional systems and methods often use air chillers that have open-air cooling nozzles. An improved system according to this disclosure preferably uses a chiller that cools using a refrigerant system in a closed circulating loop for the refrigerant fluid and the coolant fluid to the heat exchanger. This eliminates the open-air cooling nozzles of open-air cooling nozzles that frequently clog and cost time to clean. In various embodiments, there are no open-air chiller coils or air coils to foul, which reduces maintenance time.

The prior art systems and methods typically use frame/plate or spiral heat exchangers, which are more prone to plugging and more difficult to clean. It is easier to drain and clean a tube-and-shell heat exchanger in preferred embodiments according to the improved systems and methods according to this disclosure.

EXAMPLES

Functionally, in one comparison, a conventional drilling mud cooling system processed 288,000 lb./hr. of drilling mud, removing 1.53 million BTU of heat energy, or providing 127 T of refrigeration for cooling of the drilling mud using a system and method according to the prior art. On a comparable job, an improved system and method according to this disclosure processed the same 288,000 lb./hr. of hot drilling mud from the well, removing 8 million BTU of heat energy (81% more), equivalent to 670 T of refrigeration for cooling of the drilling mud. This is accomplished by utilizing the more efficient process of drawing cleaner drilling mud from the last active volume mud tank, processing the drilling mud through a heat exchanger, and discharging it into the same last active volume mud tank, which also acts as a suction pit for pumping of the drilling mud to the wellbore. In addition, the use of a VFD improves the efficiency of the system and method. Either a tube-and-shell or spiral heat exchanger may be used, but a tube-and-shell heat exchanger is preferred.

In one exemplary prototype operation, a mud cooling system according to this disclosure improved efficiency by reducing the equipment footprint on the drilling rig location, that is, on the well site. This invention required 1100 sq ft of space rather than the 1800 sq ft of space required by a similarly sized conventional system. That is an improvement of 39%. In another prototype operation, a cooling system according to this disclosure, when run in dual mode having two chillers for greater cooling capacity, took only 2200 sq ft of area compared to a conventional single system which took 6800 sq ft of area. That is a 68% improvement.

Interpretation, Definitions, and Usages

Basic Principles of Interpretation

The words, terms, phrases, and other symbols used herein have their plain, ordinary meaning to persons of skill in the art of this disclosure, except to the extent explicitly and clearly defined in this disclosure, on the condition that even if explicitly defined in this disclosure, the specific context of a usage could still require a different or more specific meaning. The definitions provided are intended to help clarify—not confuse or be applied blindly without regard to the relevant context. All possible relevant senses of the multitude of words used in this disclosure may not be accounted for in a specific provided definition. The applicable sense or senses can depend on the specific context of the usage.

Initially, as a general aid to interpretation, the possible definitions of the words, phrases, and other symbols used herein are intended to be interpreted by reference to comprehensive general dictionaries of the English language published before or about the time of the earliest filing of this application for patent. A preferred dictionary is the American Heritage Dictionary of the English Language, 5$^{th}$ Edition (Houghton Mifflin Harcourt, 2019). Where several different general definitions are available, it is intended that the broadest definitions or senses be selected that are consistent with this disclosure and the description of the presently most-preferred embodiments, including without limitation as shown in a figure of any drawing.

After initially consulting such general dictionaries of the English language, it is intended that the words, phrases, or other symbols used herein be further interpreted or the most appropriate general definition or definitions be further selected by consulting technical dictionaries, encyclopedias, treatises, or relevant prior art to which the claimed invention pertains. If necessary to resolve any remaining doubt, utilizing the patent prosecution record may be helpful to select from among the possible interpretations.

Terms or phrases made up of more than one word (for example, compound terms or phrases or names) are sometimes not found in general dictionaries of the English language. Compound terms or names are to be interpreted as a whole, and not by parsing the separate words of the compound term, which might result in absurd and unintended interpretations. For example, in the context of railroad technology, a "coal car" does not mean a car made of coal but is well understood to mean the railroad car is for hauling coal. In general, compound terms are to be interpreted as they would be understood in the art and consistent with the usage in this specification.

Examining relevant general dictionaries, encyclopedias, treatises, prior art, and the patent record will make it possible to ascertain the appropriate meanings that would be attributed to the words and terms of the description and claims by those skilled in the art, and the intended full breadth of the words and terms will be more accurately determined. In addition, the improper importation of unintended limitations from the written description into the claims will be more easily avoided.

If there is any conflict in the usages of a word or term in this disclosure and one or more patent(s) or other documents that are incorporated by reference, the definitions that are consistent with the original material of this disclosure should be adopted in interpreting the original material of this disclosure, and the definitions that are consistent with the document incorporated by reference should be adopted in interpreting the material from that document.

Words of language often have multiple different senses. The selection of the applicable sense is usually understood from the particular context in which the word is used. If a word is specifically defined herein in a particular sense that does not reasonably apply in the context of a particular instance of usage elsewhere in the disclosure or claims, an applicable sense definition should be applied, not an inapplicable definition for a different context of usage. If any explicit definition herein is plainly obnoxious both to every ordinary meaning and to every technical meaning in the art for a usage in a particular context, the explicit definition herein should be disregarded as an obvious and unintended error.

Terms such as "first," "second," "third," etc. (adjective) may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require there be any "second" similar or corresponding component, part, or step. Similarly, the mere use of the word "second" does not require there be any "first" or "third" similar or corresponding component, part, or step. Further, the mere use of the term "first" does not require the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

If there is a discrepancy between the written description and one or more figures of the drawing, a person of skill in the art would recognize that the drawing is essentially correct and a person of skill in the art can understand the disclosure from the figures of the drawing.

It should be understood that algebraic variables and other scientific symbols or notations used herein are selected according to convention, or, if no convention, arbitrarily. For example, the algebraic variables "a" and "b" can be selected arbitrarily.

It should be understood that an element, part, component, or ingredient can have more than one characteristic and that it can be characterized or classified in different, independent respects.

The headings and subheadings used in herein are intended for convenient reference but are not intended to be limiting.

Patent Terminology

A patent "claim" (noun) means either: (a) a statement of the subject matter for which legal protection is sought in an application for patent; or (b) a statement of the subject matter for which legal protection has been granted (that is, legally recognized) in an issued patent. A patent claim is distinguishable from other types of legal claims and distinguishable from non-legal claims, such as factual or medical claims.

"Disclosure" (noun) (of an application for patent) means the specification of the written description with any original claims and any drawings, as of the effective filing date of the subject matter of a claim. The purpose of the disclosure is to disclose, that is, to make known. The applicable national law may provide a more particular definition or requirements for a disclosure of a patent.

An "original claim" (noun phrase) of a patent is a claim that is filed at the time of filing an application. An original claim is also part of the original disclosure. For the purposes of disclosure, an original claim can be treated as disclosure; however, for the purposes of examination of patentability and interpretation of full scope of an issued patent, any claim should be interpreted as broadly as literally stated except for any obvious error or except as may be interpreted under the doctrine of equivalents. For the purposes of disclosure, all variations, combinations, and permutations in which one or more limitations, elements, clauses, and descriptive terms from one or more of the original claims is introduced into another original claim are part of the disclosure. For example, any original claim that is dependent on another original claim can be amended to include one or more limitations found in any other original claim that is dependent on the same original base claim.

"Invention" (noun) means: (1) the act or process of inventing; or (2) a new and useful technological idea, such as for an article, manufacture, composition, machine, device, method, or process, or any new and useful improvement thereof.

"Patent" (noun) means: (1) a grant made by a government that confers upon the creator (or assignee) of an invention the right to exclude others from making, using, offering to sell, selling, or importing that invention within the territory of the government for a limited period of time; (b) letters patent; or (c) an invention protected by such a patent. The applicable national law may provide more particular requirements. The applicable national law may provide a more particular identification of the patent rights.

"Specification" (noun) means a written description of the ideas in an application or patent. The applicable national law may provide a more particular definition or requirements for a specification.

Transitional Terminology

The words "comprising," "containing," "including," "having," "characterized by," and all grammatical variations thereof are intended to have an open, non-limiting meaning as to any unstated limitations.

In a claim, the transitional term "comprising," is inclusive or open-ended and does not exclude additional, un-recited elements or method steps. "Comprising" in claim language means the specified elements are essential, but other elements can be added and still form a construct within the scope of the claim. For example, a composition comprising an ingredient does not exclude it from having additional ingredients, an apparatus comprising a part does not exclude it from having additional parts, and a method having a step does not exclude it having additional steps.

In a claim, the transitional phrase "consisting essentially of" and all grammatical variations thereof are intended to limit the scope of a claim to the specified materials or steps and those that do not materially affect the basic and novel characteristic(s) of the claimed invention. A "consisting essentially of" claim occupies a middle ground between fully open claims using a "comprising" format and closed claims that are written in a "consisting of" format.

In a claim, the transitional phrase "consisting or" excludes any element, step, or ingredient not specified in the claim. For example, "consisting of" is defined as closing the claim to the inclusion of materials other than those recited except for impurities ordinarily associated therewith. For another example, a claim for a bone repair kit "consisting of" certain chemicals in a claim was infringed by a bone repair kit including a spatula in addition to the claimed chemicals because the presence of the spatula was unrelated to the subject matter of the claimed invention.

The phrase "selected from the group consisting or" (which is a kind of "Markush" grouping) means a list of alternative species within a grouping, even if the list includes the word "and." For example, "selected from the group consisting of: a, b, and c" means any one or more of "a, b, and c".

For the purposes of disclosure, however, such transitional phrases additionally subsume and include a disclosure of any more limited meanings. For example, a disclosure using the word "comprising" or like open-ended terms herein is intended to support a claim using any of the transitional terms "comprising," "consisting essentially of," or "consisting of" Similarly, a disclosure using the phrase "consisting essentially of" is intended to support a claim using the narrower phrase "consisting of"

Other Grammar

"Phrase" (noun) means a sequence of two or more words that have meaning, especially when forming part of a sentence. "Noun phrase" means a phrase formed by a noun and all its modifiers and determiners; broadly any syntactic element (such as a clause, clitic, pronoun, or zero element) with a noun's function (such as the subject of a verb or the object of a verb or preposition), for example, the phrase "coal car" for which the head is the noun "car." A noun phrase can be replaced by a single pronoun without rendering the sentence grammatically unacceptable.

The indefinite articles "a" or "an" mean at least one of the noun or noun phrase that the article introduces.

The conjunction "and" (in the sense of a listing or grouping) is open to additional elements or steps unless the context otherwise requires.

"Or" (conjunction) means: (1) (a) indicating an alternative, usually only before the last term of a series: hot or cold; this, that, or the other; (b) indicating the second of two alternatives, the first being preceded by either or whether; or (2) indicating a synonymous or equivalent expression.

For the purposes of disclosure, conjunctions "or" (in the sense of an alternative) and "and" (in the sense of a listing or grouping) can be interpreted first as open and non-limiting to other or additional possibilities, and, interpreted second, as closed and limiting.

For the purposes of disclosure, where elements are presented as groups or lists, for example, in "Markush group" format, each and every possible subgrouping of the grouped or listed elements is also disclosed as if set forth in separate lists. For example, where a disclosed group of three elements is disclosed, any subgrouping of one or two of the three elements is disclosed. For the purposes of disclosure, in various embodiments exactly one member of a group is present in, employed in or otherwise relevant to a given product or process. In various embodiments one, more than one, or all of a group's members are present in, employed in, or otherwise relevant to a given product or process.

The phrase "one or more" of something means an alternative grouping of the something.

In a "positive" (inclusionary) statement of a patent claim, an alternative grouping is met if any one or more of the statements of the grouping are met.

In a "negative" (exclusionary) statement of a patent claim, however, an alternative grouping is met only if all the statements of the grouping are met.

General Terminology

"Acceptable" (adjective) means adequate to satisfy a need, requirement, or standard, as in at least sufficient.

"Active" (adjective) means: (a) being in physical motion; or (b) functioning or capable of functioning.

"Alternative" (adjective) means allowing for a choice between two or more things from which the choice can be made.

"Apparatus" (noun) means an integrated group of materials or devices for a particular purpose.

"Capable" (adjective) means having capacity or ability.

"Capacity" (noun) means the ability or extent of an ability, for example to receive, hold, dissolve, or absorb something or means the maximum amount that can be contained, held, dissolved, or absorbed, depending on the context.

"Carrier" (noun) means a mechanism, device, or composition by which something is conveyed or conducted.

"Characteristic" (noun) means a feature that helps to identify, tell apart, or describe recognizably, for example, a distinguishing mark, trait, or property.

"Control" (noun) means a comparison for checking or verifying the results of a test or scientific experiment or means a mechanism or other input that controls the operation of a machine, computer device, or process.

"Control" (verb) means to adjust to a requirement.

"Drawing" (noun) means: (1) the act or an instance of drawing; or (2) (a) the art of representing objects or forms on a surface chiefly by means of lines; (b) a work produced by this art. In a patent, a "drawing" may comprise one or more figures.

"Element" (noun) means a fundamental, essential, or irreducible constituent of a composite entity.

"Embodiment" (noun) means a concrete or embodied form of an abstract concept.

"Especially" (adverb) means to an extent or degree deserving of special emphasis; particularly, but not necessarily so limited.

"Essentially" (adverb) means constituting or being part of the fundamental nature or essence of something.

"General" (noun) means: (1) affecting or characteristic of the majority of those involved; or (2) involving only the main feature or features rather than precise or particular details.

"Improvement" (noun) means: (1) (a) the act or process of improving; or (b) the state of being improved; or (2) a change or addition that improves.

"Method" (noun) means a manner or way of doing something, especially a structured or systematic way of accomplishing something.

"Operative" (adjective) means: (1) functioning effectively; or (2) engaged in or concerned with physical, mechanical, electrical, or other activity.

"Process" (noun) means: (1) a series of actions, changes, or functions bringing about a result; (2) a series of operations performed in the making or treatment of a product, for example, a manufacturing process; or (3) a process, art, or method, and includes a new use of a known process, machine, manufacture, composition of matter, or material.

"Provide" (verb) means to furnish, supply, make available, or prepare. It can include making available to oneself. It does not require, but can include two or more individuals or actors, that is, it can include, but does not require a provider and a recipient.

"Select" (verb) means to choose from two or more alternatives.

"Significant" (adjective) means relatively large in importance, value, degree, amount, or extent in the relevant context. "Insignificant" means the opposite.

"Step" (noun) means one of a series of actions, processes, or measures taken to achieve a goal or purpose.

"Substantial" (adjective) and "substantially" (adverb) mean considerable in importance, value, degree, amount, or extent in the relevant context. "Substantial" is more, as a matter of degree, than "significant."

"System" (noun) means a group of interacting, interrelated, or interdependent elements forming a complex whole.

"Use" (verb) means to put into service; to make work or employ something for a particular purpose or for its inherent or natural purpose.

"Usage" (noun) means the act of using, including usage data such as start time, end time, duration, type of activity, and intensity.

"Various" (adjective) means of diverse kinds purposefully arranged or grouped but not requiring uniformity.

"In various embodiments" (phrase) means one or more of various embodiments have the step, element, or attribute, but not all necessarily have it. Any of the various embodiments can be combined with any other of the various embodiments insofar as can be practical and non-contradictory to each other.

CONCLUSION

Therefore, the disclosure can be understood by a person of skill in the art to obtain the purposes and advantages mentioned as well as those that are inherent therein.

The various disclosed embodiments are illustrative only, as the disclosure can be modified and practiced in different but equivalent manners apparent to those skilled in the art having the benefit of the teachings herein. It is, therefore, evident that the particular illustrative embodiments disclosed above can be altered or modified and all such variations are considered within the scope of the disclosure.

The various elements or steps according to the disclosed elements or steps can be combined advantageously or practiced together in various combinations or subcombinations of elements or sequences of steps to increase the efficiency and benefits that can be obtained from the disclosure.

It should be understood that one or more of the above and various embodiments can be combined with one or more of the other various embodiments, unless explicitly stated otherwise.

The illustrative disclosure can be practiced in the absence of any element or step that is not specifically disclosed or claimed.

Any particular embodiment of the disclosure that falls within the prior art can be explicitly excluded from any one or more of the claims. Because such embodiments are deemed to be known to one of ordinary skill in the art, they can be excluded even if the exclusion is not set forth explicitly herein.

Any particular embodiment of the disclosure can be explicitly excluded from a particular patent claim, for any reason, whether or not related to the existence of prior art. Where elements are presented as lists, for example, in Markush group format, each subgroup of the elements is also disclosed, and any element or elements can be removed from the claimed group.

Those of ordinary skill in the art will recognize or be able to ascertain using no more than routine experimentation many equivalents to the specific embodiments of this disclosure. Those of ordinary skill in the art will appreciate that various changes and modifications to this description can be made without departing from the spirit or scope of the disclosure.

The description of the specific examples herein does not necessarily point out what an infringement would be but are to provide at least one explanation of how to make and use the disclosure.

Furthermore, no limitations are intended to the details of composition, design, construction, or steps of the disclosure, other than as set forth in a specific claim.

What is claimed is:

1. A system for cooling a drilling mud, the system comprising:
   (a) a heat-exchanger apparatus for removing at least some of the heat from the drilling mud, wherein the heat-exchanger apparatus comprises:
      (i) a heat exchanger for removing at least some of the heat from the drilling mud when the drilling mud is pumped through the heat exchanger; and
      (ii) a mud pump for pumping the drilling mud through the heat exchanger;
   (b) a first heat-exchanger conducting line for drawing the drilling mud from a last active volume mud tank of a plurality of active volume mud tanks and conducting the drilling mud to the heat-exchanger apparatus;
   (c) a second heat-exchanger conducting line for returning the drilling mud from the heat-exchanger apparatus back into the last active volume mud tank; and
   (d) a suction line operatively connected to a rig pump for pumping the drilling mud into a drill string of a well, wherein the suction line is operatively connected to draw the drilling mud from an upper portion of the last active volume mud tank.

2. The system according to claim 1, wherein the first heat-exchanger conducting line is operatively connected to draw the drilling mud from a lower portion of the last active volume mud tank.

3. The system according to claim 1, wherein the second heat-exchanger conducting line is operatively connected to return the drilling mud to an upper portion of the last active volume mud tank.

4. The system according to claim 1, wherein the mud pump of the heat-exchanger apparatus is electrically driven, and wherein the system additionally comprises: a variable frequency drive for controlling a pumping rate of the electrically driven mud pump, wherein the variable frequency drive is capable of adjusting a pumping rate for pumping of the drilling mud through the heat-exchanger apparatus.

5. The system according to claim 1, wherein the heat exchanger of the heat-exchanger apparatus comprises a tube-and-shell heat exchanger.

6. The system according to claim 1 wherein the heat-exchanger apparatus additionally comprises:
   a chiller for cooling a coolant fluid; and
   a coolant pump for circulating the coolant fluid between the chiller and the heat exchanger of the heat-exchanger apparatus.

7. A system for recycling and cooling a drilling mud, the system comprising:
   (a) a plurality of mud tanks for temporarily holding the drilling mud, wherein the plurality of mud tanks are located at a well site having a drilling rig;
   (b) one or more tank connecting lines for conducting the drilling mud between the plurality of mud tanks, wherein the tank connecting lines are operatively connected between the plurality of mud tanks, whereby the plurality of mud tanks are operatively connected in series from one or more earlier mud tanks to one or more later mud tanks, and wherein one of the one or more later mud tanks is a last active volume mud tank;
   (c) a cuttings-separating apparatus for separating at least some of the cuttings from a drilling mud with cuttings to obtain a drilling mud with reduced cuttings, wherein the cuttings-separating apparatus is operatively connected between the wellhead and one or more of the earlier mud tanks;
   (d) a return line for conducting the drilling mud with cuttings, wherein the return line is operatively connected from a wellhead to the cuttings-separating apparatus;
   (e) a hot mud line for conducting the drilling mud after some of the cuttings have been removed by the cuttings-separating apparatus to one or more of the earlier mud tanks, wherein the hot mud line is operatively connected from the cuttings-separating apparatus to at least one of the one or more earlier mud tanks;
   (f) a heat-exchanger apparatus for removing at least some of the heat from the drilling mud to obtain a cooler drilling mud, wherein the heat-exchanger apparatus comprises:
      (i) a heat exchanger for removing at least some of the heat from the drilling mud when the drilling mud is pumped through the heat exchanger; and
      (ii) a mud pump for pumping the drilling mud through the heat exchanger;
      wherein the heat-exchanger apparatus is operatively connected to receive drilling mud from the last active volume mud tank and wherein the heat-exchanger apparatus is operatively connected to return the drilling mud after it has been cooled by the heat-exchanger apparatus to at least one of the one or more later mud tanks;
   (g) a first heat-exchanger conducting line for conducting the drilling from the last active volume mud tank to the heat-exchanger apparatus, wherein the first heat-exchanger conducting line is operatively connected from the last active volume mud tank to the heat-exchanger apparatus;

(h) a second heat-exchanger conducting line for conducting the drilling mud after it has been cooled by the heat-exchanger apparatus from the heat-exchanger apparatus to at least one of the one or more later mud tanks, wherein the second heat-exchanger conducting line is operatively connected from the heat-exchanger apparatus to at least one of the one or more later mud tanks;

(i) a rig pump for pumping the drilling mud to a drill string, wherein the rig pump is operatively connected to the last active volume mud tank and to the drill string; and (j) a suction line for conducting the drilling mud from the last active volume mud tank, wherein the suction line is operatively connected from the last active volume mud tank to the rig pump, and wherein the suction line is operatively connected to draw the drilling mud from an upper portion of the last active volume mud tank.

8. The system according to claim 7, wherein the mud pump of the heat-exchanger apparatus is electrically driven, and wherein the system additionally comprises: a variable frequency drive for controlling a pumping rate of the electrically driven mud pump, wherein the variable frequency drive is capable of adjusting a pumping rate for pumping of the drilling mud through the heat-exchanger apparatus.

9. A method for cooling a drilling mud at a well site, the method comprising the steps of:

(a) drawing the drilling mud from a last active volume mud tank of a plurality of active volume mud tanks;

(b) pumping the drilling mud through a heat-exchanger apparatus; and (c) returning the drilling mud after it has been cooled through the heat-exchanger apparatus to the last active volume mud tank; and (d) drawing the drilling mud from the last active volume mud tank through a suction line, wherein the suction line is operatively connected to a rig pump for pumping the drilling mud into a drill string in a well, and wherein the suction line is operatively connected to draw the drilling mud from an upper portion of the last active volume mud tank.

10. The method according to claim 9, wherein a first heat-exchanger conducting line is operatively connected to draw the drilling mud from a lower portion of the last active volume mud tank.

11. The method according to claim 9, wherein a second heat-exchanger conducting line is operatively connected to return the drilling mud to an upper portion of the last active volume mud tank.

12. The method according to claim 9, wherein the step of pumping the drilling mud employs an electrically driven mud pump; and wherein the step of pumping additionally comprises: a step of employing a variable frequency drive for controlling a pumping rate of the electrically driven mud pump, wherein the variable frequency drive is capable of adjusting the pumping rate for pumping of the drilling mud through the heat-exchanger apparatus.

\* \* \* \* \*